US007776287B2

(12) United States Patent
Hugues et al.

(10) Patent No.: US 7,776,287 B2
(45) **Date of Patent: *Aug. 17, 2010**

(54) INTERNAL EXCHANGER FOR GAS-LIQUID-SOLID REACTOR FOR FISCHER-TROPSCH SYNTHESIS

(75) Inventors: Francois Hugues, Vernaison (FR); Bertrand Szymkowiak, Lyons (FR); Jean-Christophe Viguie, Saint Symphorien d'Ozon (FR); Jean-Marc Schweitzer, Villette de Vienne (FR); Michel Munier, Le Chatelet en Brie (FR); Dominique Chretien, Paris (FR); Eric Caprani, Paris (FR); Damien Douziech, Rueil Malmaison (FR)

(73) Assignees: Institut Francais du Petrole, Rueil Malmaison Cedex (FR); ENI S.p.A., Rome (IT)

( * ) Notice: Subject to any disclaimer, the term of this patent is extended or adjusted under 35 U.S.C. 154(b) by 461 days.

This patent is subject to a terminal disclaimer.

(21) Appl. No.: 11/785,911

(22) Filed: Apr. 20, 2007

(65) Prior Publication Data

US 2008/0000623 A1 Jan. 3, 2008

(30) Foreign Application Priority Data

Apr. 21, 2006 (FR) .................................. 06 03691

(51) Int. Cl.

| | |
|---|---|
| ***F28D 7/00*** | (2006.01) |
| *F28D 1/00* | (2006.01) |
| *F28D 7/10* | (2006.01) |
| *F28F 9/22* | (2006.01) |
| *B01J 8/04* | (2006.01) |
| *B01J 10/00* | (2006.01) |

(52) U.S. Cl. ....................... 422/201; 422/197; 165/157; 165/145; 165/175; 165/76; 165/177

(58) Field of Classification Search ................. 422/201, 422/197; 165/157, 145, 177, 76, 175; 137/15.18, 137/834, 835

See application file for complete search history.

(56) References Cited

U.S. PATENT DOCUMENTS

| | | | | |
|---|---|---|---|---|
| 3,796,547 | A * | 3/1974 | Muenger | 422/200 |
| 4,060,127 | A | 11/1977 | Savin et al. | |
| 4,187,902 | A * | 2/1980 | Miller et al. | 165/76 |
| 4,856,581 | A * | 8/1989 | Santoro | 165/130 |
| 5,092,038 | A * | 3/1992 | Geppelt et al. | 29/890.048 |
| 5,779,994 | A * | 7/1998 | Kupper et al. | 422/197 |
| 6,174,159 | B1 * | 1/2001 | Smith et al. | 431/7 |
| 2005/0080147 | A1 | 4/2005 | Hawthorne et al. | |

FOREIGN PATENT DOCUMENTS

| | | | |
|---|---|---|---|
| EP | 0038098 | A1 | 10/1981 |
| WO | WO 2004/101475 | A1 | 11/2004 |
| WO | WO 2005/075065 | A1 | 8/2005 |

OTHER PUBLICATIONS

Maretto et al, Design and optimisation of a multi-stage bubble column slurry reator for Fischer-Tropsch synthesis, 2001, Catalysis Today, 66, 241-248.*

Search Report dated Dec. 14, 2006.

* cited by examiner

*Primary Examiner*—Walter D Griffin
*Assistant Examiner*—Natasha Young
(74) *Attorney, Agent, or Firm*—Millen, White, Zelano & Branigan, P.C.

(57) ABSTRACT

This present invention describes a novel type of internal exchanger intended to carry out Fischer-Tropsch synthesis. This exchanger has a modular design and comprises a central tube with partitions allowing at the same time the supply of coolant to the hairpins of the module and the recovery of the partially vaporized fluid from these same hairpins.

14 Claims, 8 Drawing Sheets

N

N + 1

INTERNAL EXCHANGER FOR GAS-LIQUID-SOLID REACTOR FOR FISCHER-TROPSCH SYNTHESIS

FIELD OF THE INVENTION

The invention relates to a novel type of internal exchanger fitted into an industrial-scale reactor allowing the Fischer-Tropsch synthesis reaction to be carried out.

This type of reactor, generally of large size, makes use of a strongly exothermic chemical reaction and therefore requires an exchanger device allowing the calories to be removed from the reaction medium. The reaction medium essentially comprises a liquid phase crossed by gas bubbles, said liquid phase containing solid fine particles of catalyst in suspension. This medium is generally called "slurry" by a person skilled in the art.

The exchange bundle which is the subject of the present invention allows simplified handling operations and optimized inspection and maintenance phases. More particularly, the exchange bundle which is the subject of the invention is designed in a modular fashion and allows the removal of any part of the bundle, for example in the case of repair, without having to dismantle the whole of the latter.

The exchange surface provided by the exchange bundle is distributed uniformly throughout the capacity of the reactor as a whole, in order to allow accurate temperature control, and this distribution is kept uniform, or as uniform as possible, even when a part of the bundle is isolated.

EXAMINATION OF THE PRIOR ART

Fischer-Tropsch synthesis reactors are generally equipped with an exchanger inside or outside the reactor in order to remove the calories generated by the chemical reaction.

Generally this exchanger allows steam to be generated at medium pressure from a water feed. However other fluids may be used without restricting the scope of the invention.

Taking account of the large size of the exchange surface to be installed, the bundle is generally complex and it is often divided into modules in order to allow easy maintenance.

One such type of bundle is described for example in US patent 2005/0080147 which describes a modular configuration with a conventional feed method making use of a two-stage rake distributor An industrial-scale reactor for Fischer-Tropsch synthesis generally has very large dimensions, typically 40 metres high and 10 metres in diameter.

The exchange surface to be installed to remove the calories is of the order of 4 to 30 $m^2/m^3$ of reaction medium, preferably 4 to 20 $m^2/m^3$ and even more preferably 4 to 15 $m^2/m^3$.

The volume of the reaction medium is defined as the capacity of the reactor less the volume occupied by the exchange bundle.

The bubbles present in the reaction medium can generate vibrations on the exchange bundle, and the present invention therefore provides for the different constituent parts of the exchanger to be secured by means of stays installed at suitable points.

By stays is understood to mean any support allowing parts of the bundle to be connected, either at a hairpin, or between hairpins, or between modules.

The tubes numbered F1 and F2 re-entering the bottom of the reactor correspond to the points of entry for the reagents.

Figure 2:
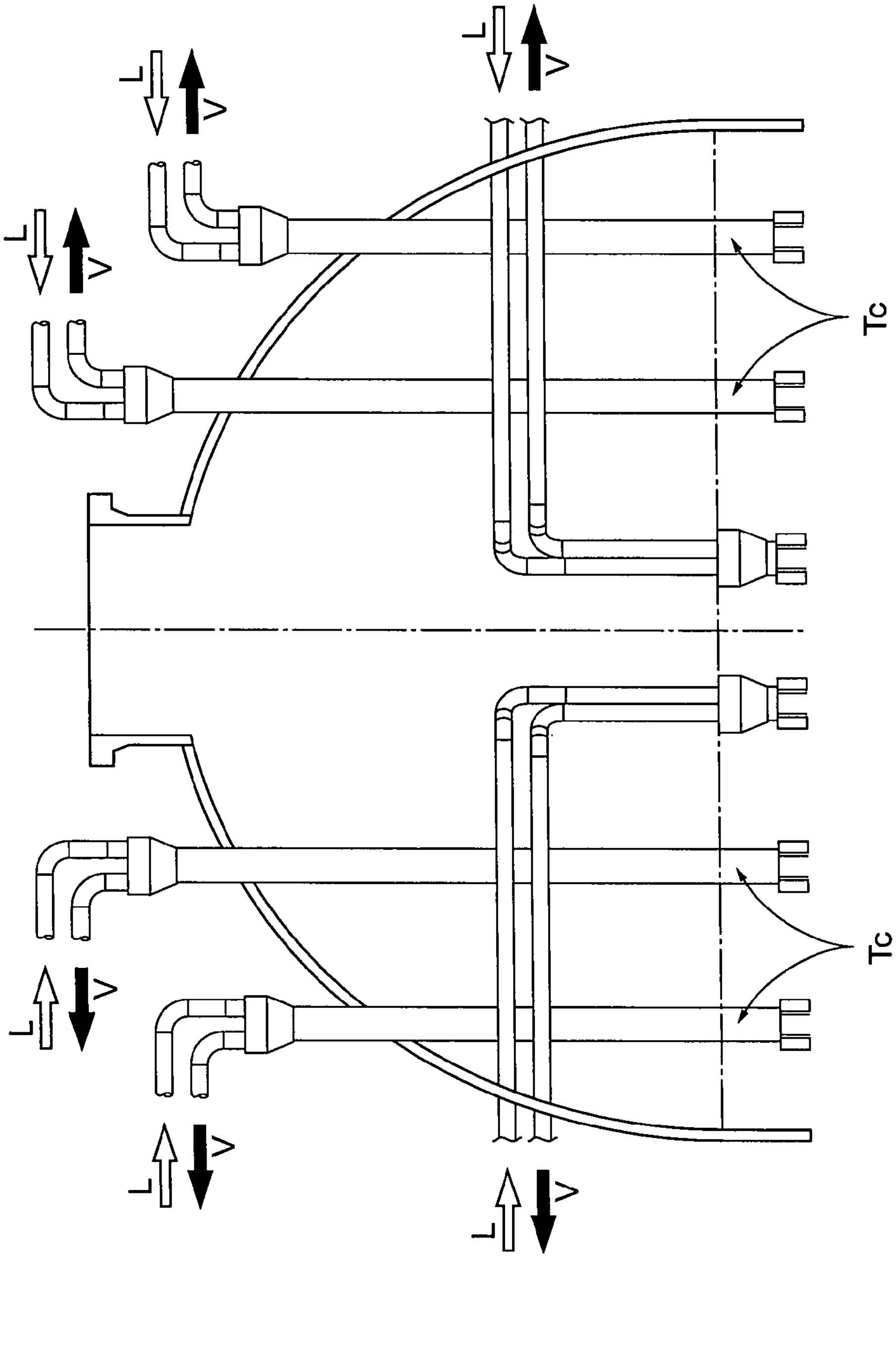

FIG. 2 is a view of the top part of the reactor illustrating the ends of the central tubes (Tc) serving to supply the bundle with coolant (designated L) and for extracting the partially vaporized fluid (designated V).

Figure 1:
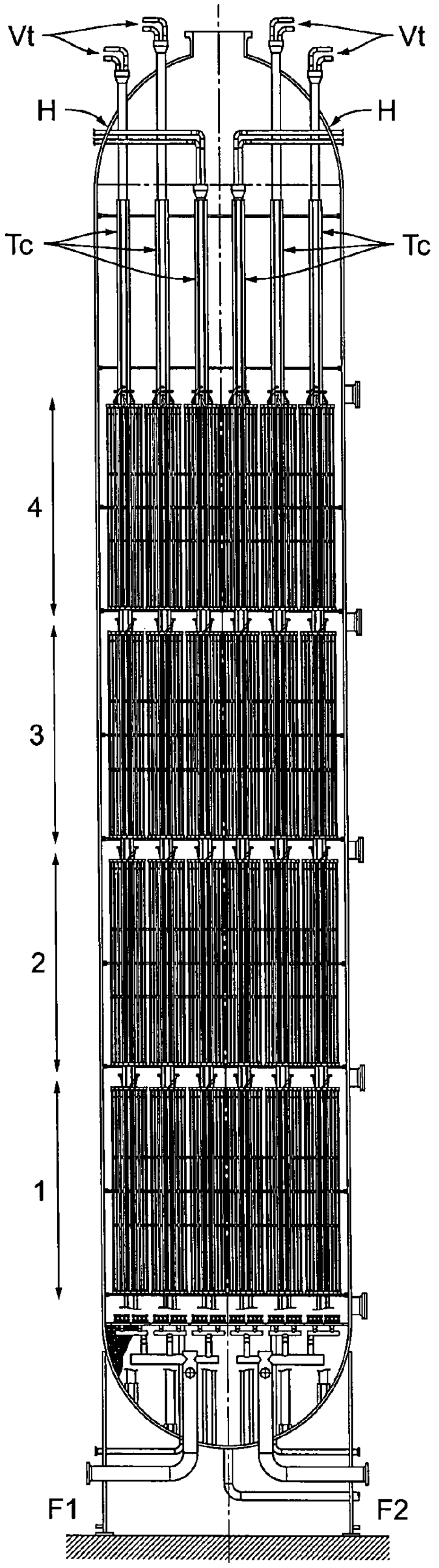
FIG. 1 is an overall view of the reactor for Fischer-Tropsch synthesis illustrating the general arrangement of the exchange bundle divided into different stages numbered 1, 2, 3, 4, conventionally from bottom to top.
Figure 3:
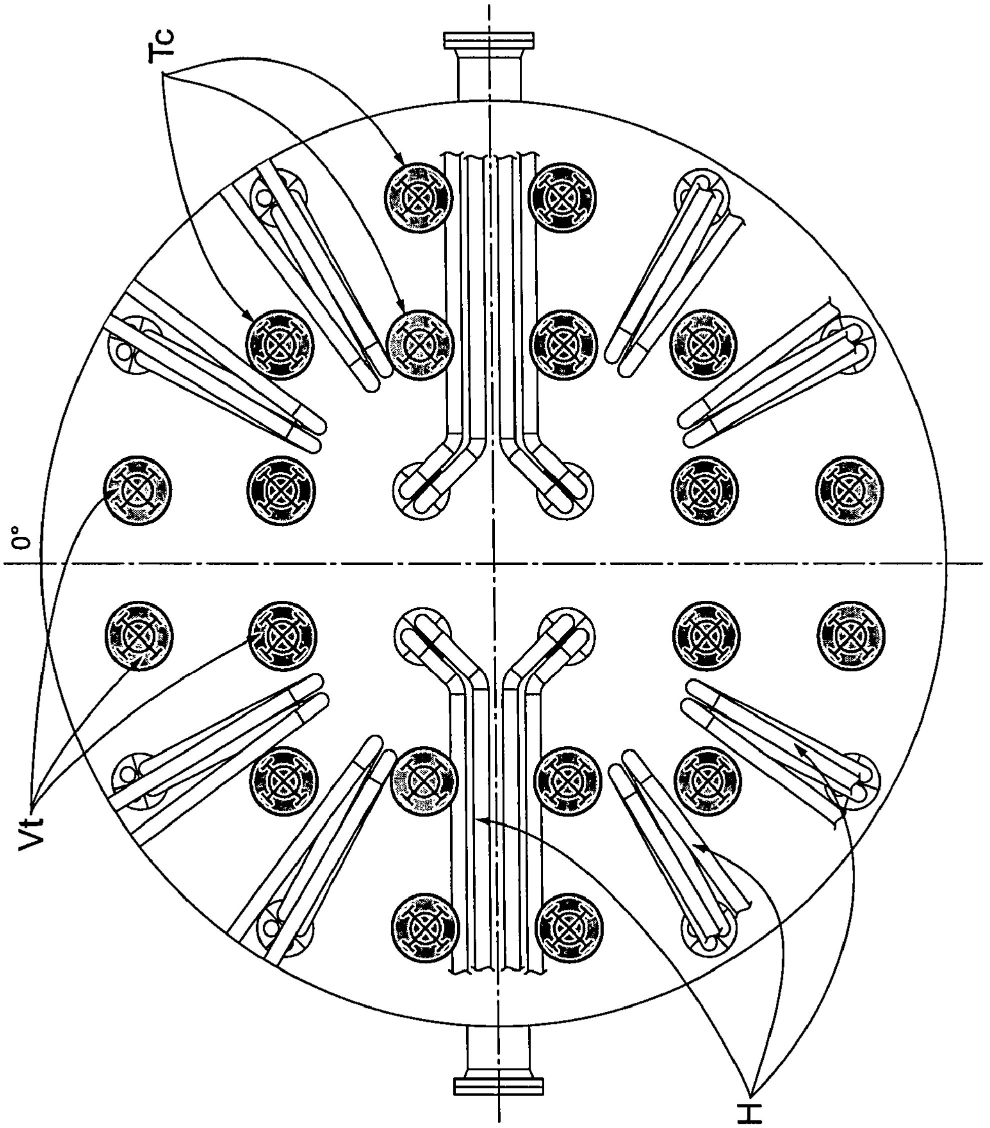

FIG. 3 is a plan view of the bundle according to the invention illustrating the position of the modules and of the central tubes (Tc). Some modules have a vertical inlet/outlet pipe (designated Vt), while other modules have a horizontal inlet/outlet pipe (designated H). The majority, and preferably all, of the inlet/outlet pipes, enter or leave the reactor at its top dome, as shown in FIG. 1.

Figure 4:
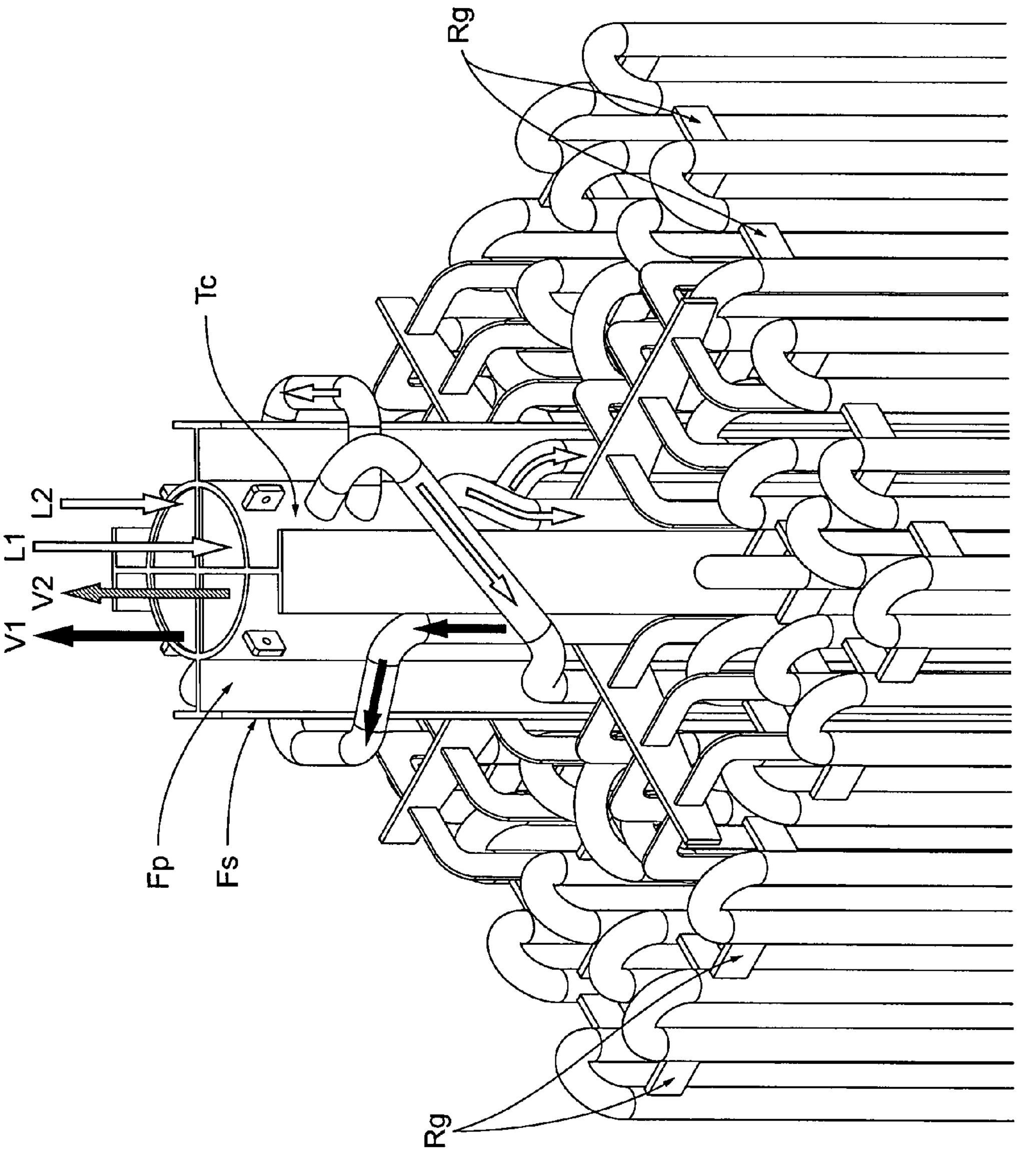

FIG. 4 is a perspective view of the top part of a module illustrating the hairpins comprising a module and surrounding the central tube, as well as the division of the central tube into two independent circuits (L1/V1, L2/V2). FIG. 4 also shows the primary leaves (Fp) and the secondary leaves (Fs) allowing the inertia of the central tube (Tc) to be increased, as well as some stays (Rg).

Figure 5A:
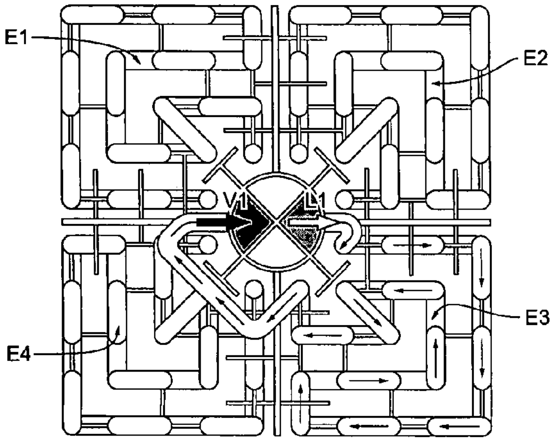
Figure 5B:
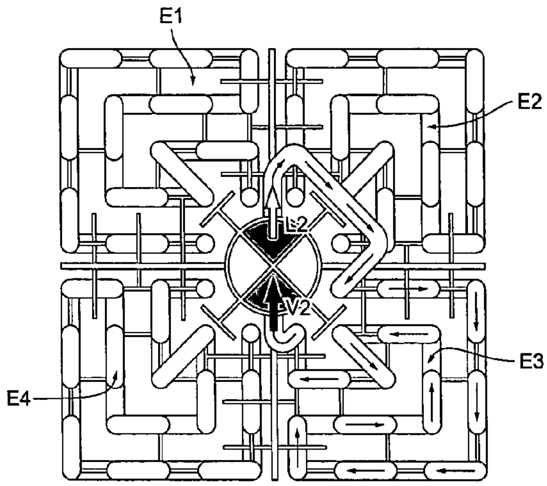

FIG. 5 is a plan view of a module illustrating the supply to the hairpins by the first circuit (FIG. 5*a*) and by the second circuit (FIG. 5*b*) at two successive stages designated N and N+1.

The concepts of first and second circuit will be explained in the detailed description. On this FIG. 5, the hairpins E1, E2, E3 and E4 are numbered a clockwise.

Figure 6:
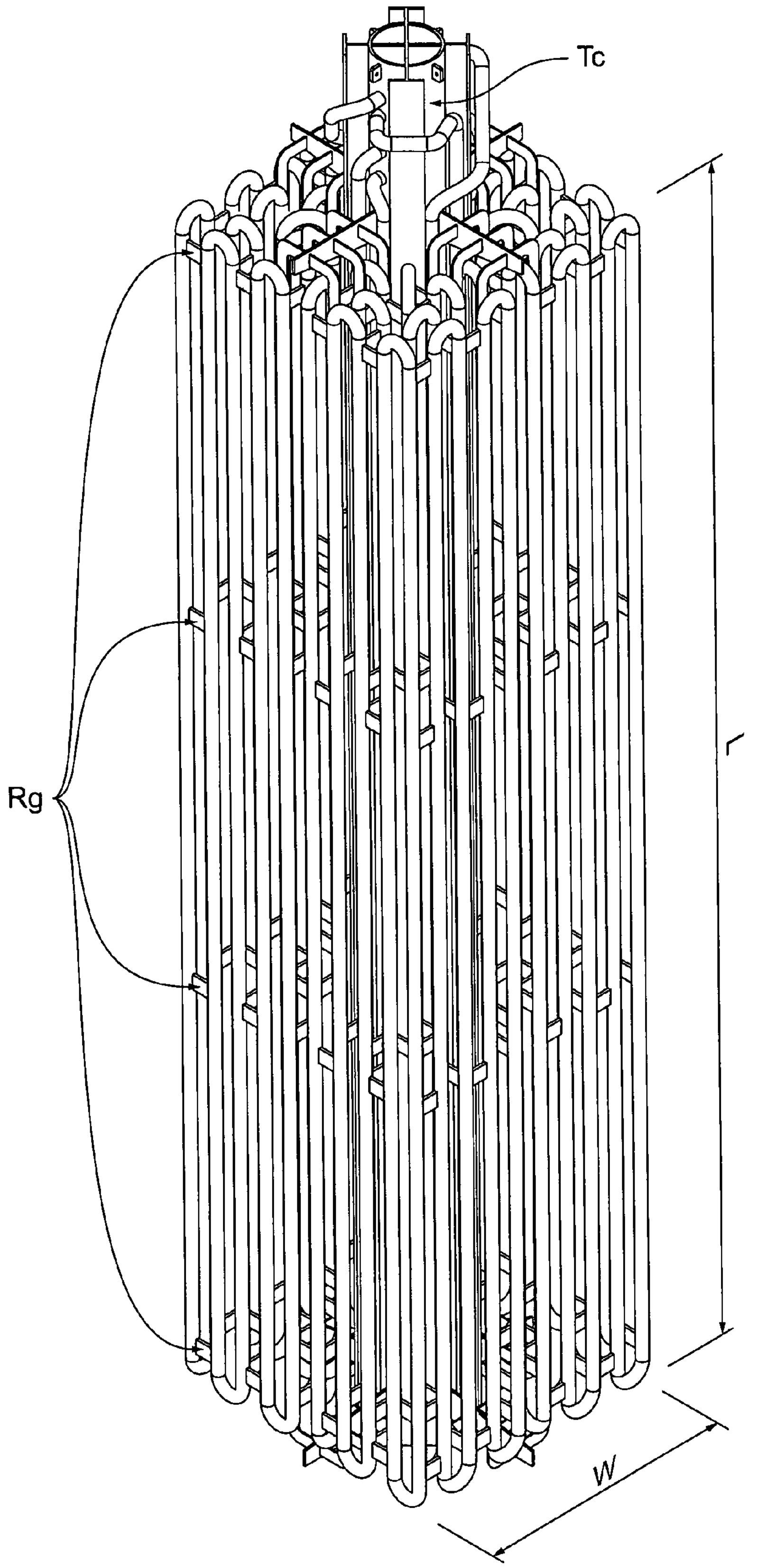

FIG. 6 is a general view of a module comprising the bundle showing the position of the various stays of said module (designated Rg) and specifies the dimensions L (height of a module) and W (width of a module).

Figure 7B:
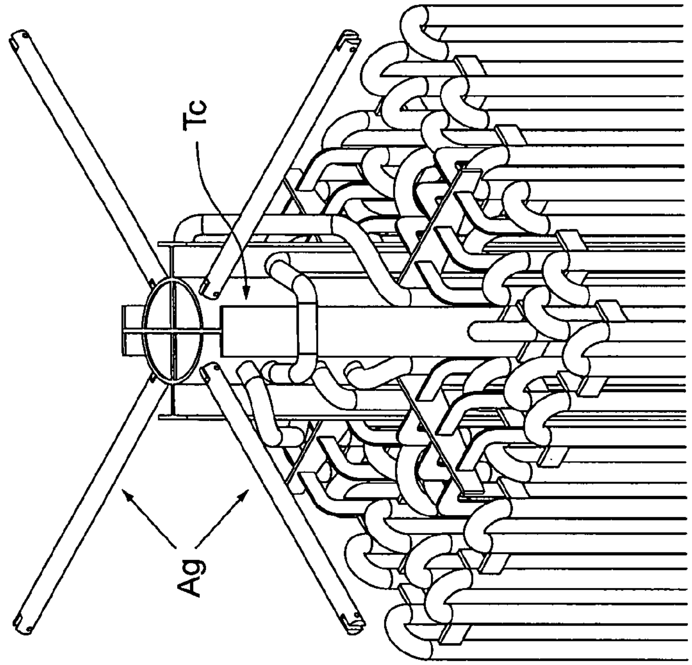
Figure 7A:
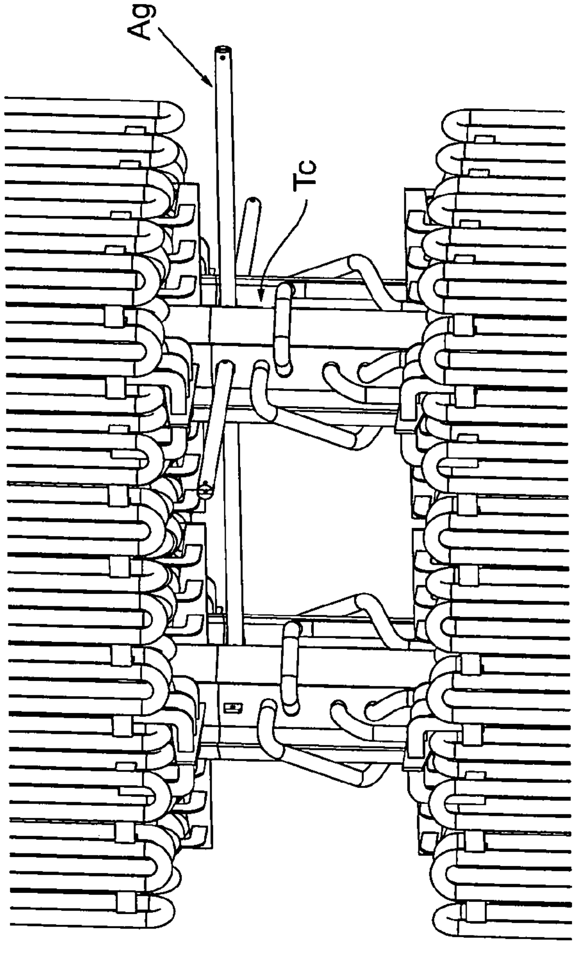

FIG. 7 is a view of the space between stages illustrating a set of stays (Ag) between central tubes.

Figure 8:
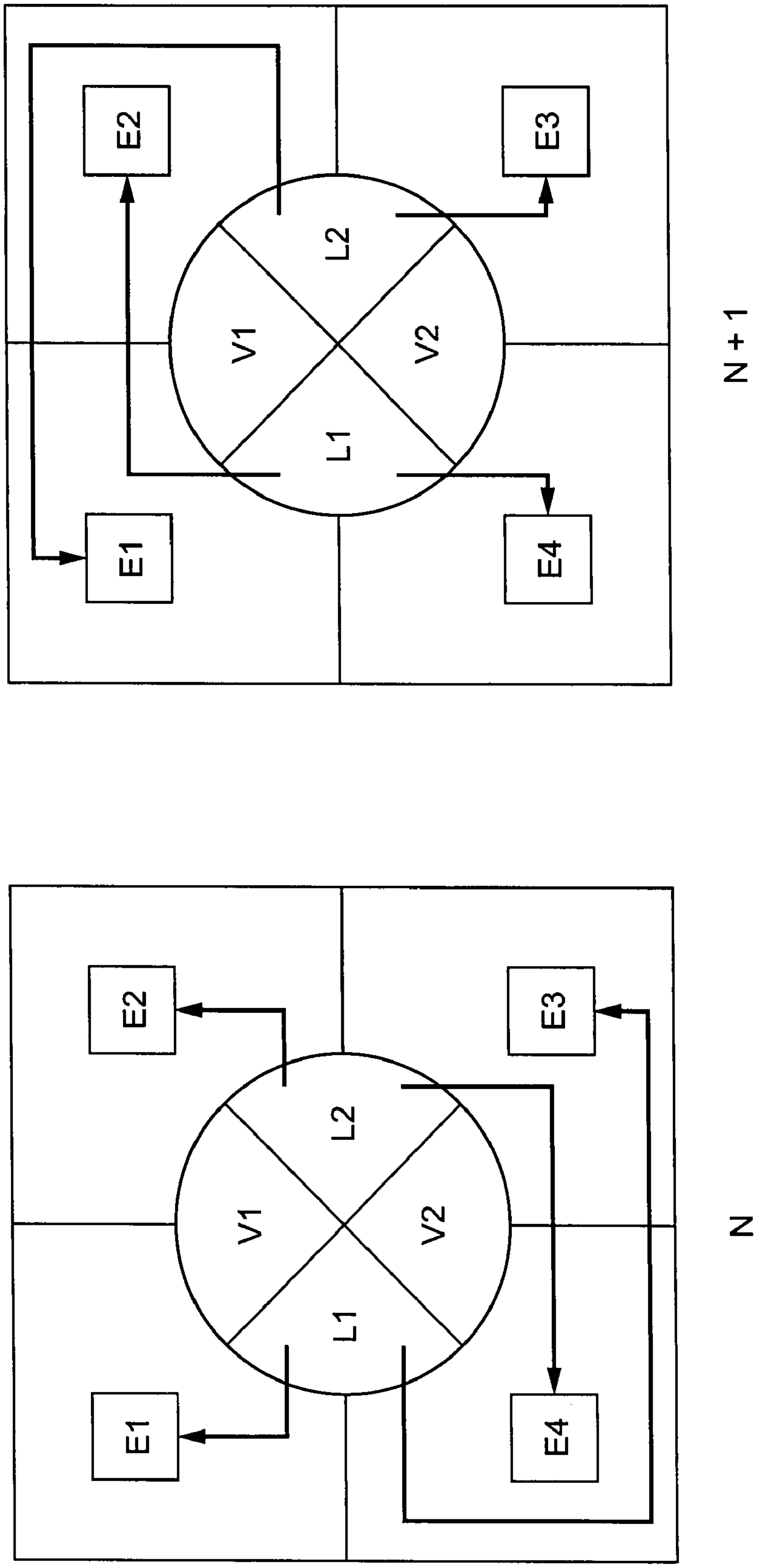

FIG. 8 is a schematic representation of the hairpins of a bundle in 2 successive stages designated N and N+1, illustrating the feed method known as "alternating".

BRIEF DESCRIPTION OF THE INVENTION

The present invention relates to a exchange bundle of modular design, contained inside a reactor intended to carry out the Fischer-Tropsch synthesis reaction.

The Fischer-Tropsch reactor generally comprises a cylindrical casing closed at the top by a top dome and at its bottom by a bottom dome equipped with means for introduction of reaction fluids, the top dome having means for the introduction of a coolant and means of evacuation of said coolant, partially vaporized.

The internal exchanger fitted to the Fischer-Tropsch reactor comprises an exchange bundle immersed within the gas-liquid-solid reaction medium of the "slurry" type.

Said exchange bundle comprises modules that are generally identical, uniformly distributed over a section of the reactor forming a stage of modules.

The bundle generally comprises at least two stages of identical modules, each module comprising a set of identical hairpins distributed around the central tube common to the module in question and to the set of modules vertically aligned with the module in question at the different stages of the bundle.

Said central tube comprises partitions allowing at the same time the supply of coolant to the hairpins of the module and the recovery of the partially vaporized fluid from these same hairpins.

The feeding of the hairpins of a given module from the central tube can be carried out in various ways, and will preferably alternate within said module, in the specific meaning of this expression that will be given in the detailed description below.

The bundle which is the subject of the present invention generally comprises a set of identical modules, called standard modules, with the exception of a limited number of modules adjoining the wall of the reactor, these standard modules being on the one hand uniformly distributed over a section of the reactor forming a stage of modules, and on the other hand, vertically grouped around a central tube, thus forming a vertical group of modules distributed over the different stages.

The whole bundle can thus generally be obtained by multiplying the vertical groups of modules, each vertical group of modules being grouped around a single central tube. This arrangement in vertical groups of modules is of benefit in particular during operations requiring one or more hairpins of a module to be removed, regardless of the stage concerned, even the lower stage of the reactor.

A preferred access procedure to said hairpin or to said module is described and also forms part of the present invention.

The invention thus also relates to a method of removal of a hairpin of a reactor from Fischer-Tropsch synthesis comprising an exchange bundle according to the invention.

DETAILED DESCRIPTION OF THE INVENTION

The exchange bundle that is the subject of the present invention has a modular design, i.e. it comprises modules most of which are identical, with the exception of the modules adjoining the wall, which may be of a different type.

Each module comprises a number of identical hairpins surrounding a central tube, said central tube serving to supply coolant to the hairpins of the module and to recover partially vaporized fluid from these same hairpins. The central tubes are designated Tc on the various figures where they appear.

The hairpins of each module are distributed regularly around the central tube serving to feed them. Each hairpin comprises a conduit, preferably cylindrical, extending vertically and describing a certain number of vertical outward and return legs, each outward leg being connected to each return leg by a U-shaped portion or U-bend. An outward and return combination is generally called a "pass" by a person skilled in the art.

FIGS. 5*a* and 5*b* show the configuration of the 4 hairpins surrounding the central tube. Each hairpin extends in the form of vertical outward and return legs such as to occupy in a regular manner a space around the central tube which corresponds in this case to a dial. Thus in FIGS. 5*a* and 5*b*, 4 dials can be seen; corresponding to the hairpins designated E1, E2, E3 and E4, designated conventionally clockwise.

A given hairpin is fed with coolant via a sector of the central tube, and the partially vaporized coolant is collected in another sector of the central tube separate from the supply sector.

The set of modules of a given stage generally covers the section of the reactor and forms a stage of modules. Generally, the number of modules per stage is comprised between 5 and 80, preferably between 40 and 70, and even more preferably, between 45 and 65.

For a given reactor, the number of modules per stage depends on the size of the module.

Preferably, the number of hairpins per module is an even number and equal to 2, 4, 6 or 8.

These hairpins can for example have a square-shaped overall outside section and thus form a module having an overall section in the shape of a quadrilateral when there are 4.

They can also have a triangular overall outside section and form a module with an overall outside section shape in the form of a hexagon when there are 6 or an octagon when there are 8.

In the particular case of a module comprising 4 hairpins, the number of modules per stage will be between 0.4 and 0.7 modules per square metre of reactor, and preferably between 0.45 and 0.65 modules per square metre of reactor section.

The modules are divided into different stages, generally 1 to 10, preferably 1 to 6, and even more preferably 2 to 4 stages, even into 4 stages which allow the full height of the reactor to be covered.

The stages are separated by an empty space of between 0.8 metre and 1.5 metre high.

This space allows inspection of all of the weld points of the modules.

During a maintenance stoppage, a person can gain access to the space between stages, inspect the welds and carry out minor maintenance operations in situ without dismantling.

The central tube of a module belonging to a stage N extends to the following stage N+1, so that the central tube is common to the set of modules situated at different stages along the same vertical. This set of vertically-aligned modules is called a vertical group of modules.

In the case of a cylindrical reactor of constant diameter, each stage of the bundle thus preferably comprises a number of identical modules, called standard modules, with the exception of some modules adjoining the wall of the reactor that have fewer hairpins than the standard modules. It is thus possible to use different modules in the case where particular internals are incorporated into a cylindrical reactor or in the case where said reactor has variations in its diameter or in its shape along its height.

Preferably, the standard modules of each stage then operate in parallel and present a number of identical hairpins.

The non-standard modules are generally situated along the walls of the reactor. As a result of the cylindrical shape of these walls, a non-standard module will comprise fewer hairpins than a standard module. For example, for standard modules comprising 4 hairpins, a non-standard module can comprise 3, 2 or even 1 hairpin. The principle of feeding each hairpin by means of a central tube common to the different hairpins of a non-standard module remains valid. There is no substantial difference between a hairpin forming part of a standard module and a hairpin forming part of a non-standard module.

The non-standard modules generally represent less than 35%, and more often less than 30% of the set of modules. Their general design is of the same type as that of the standard modules, except for a reduced number of hairpins per modules. They may not always comply with the principle of alternating supply which is preferred for the standard modules.

The supply via the central tube of the hairpins of a module and of the modules vertically aligned with the module in question is preferably alternated between two adjacent hairpins, either inside the same module or between two consecutive stages.

This central tube provides the mechanical support for the modules as well as supplying the hairpins with coolant and collecting said partially vaporized fluid on leaving the hairpins. Thus it has a double functionality, mechanical and hydraulic.

From the mechanical point of view, the central tube is preferably stiffened by an internal partitioning allowing the different supply circuits to be defined. Its inertia is equally preferably increased by primary leaves (Fp) extending outside the internal partitions, and extending over the whole length of said tube, as shown in FIG. 4. These primary leaves (Fp) comprise leaves perpendicular to the cylindrical wall of the central tube (Tc) and are welded along said wall.

The primary leaves (Fp) adjoining a central tube (Tc) can optionally be extended by other vertical elements or secondary leaves (Fs) such as those shown in FIG. 4, forming a T-shape with the primary leaf (Fp).

The assembly formed by the primary leaves (Fp) and the secondary leaves (Fs) allows the inertia of the central tube to be increased and thus the amplitude of any vibrations it may experience due to the reaction medium in which it is immersed to be limited.

The central partitioned tube and the primary leaves are generally constructed from 4 leaves arranged perpendicularly onto which a quarter-cylinder positioned between two consecutive leaves is welded over the whole length.

The 4 quarter-cylinders correctly positioned in alignment with each-other form the central tube. The part of the 4 leaves inside the central tube forms the internal partitions of the central tube, and the part of the 4 leaves outside the central tube forms the primary leaves. The hairpins constituting a module can be interconnected by means of stays (Rg) such as those shown in FIG. 6.

In the same way, stays (Ag) can connect two central tubes in the space between stages to each other as shown in FIG. 7.

Any other system of stiffening by means of elements connecting the different parts of a module to each other is compatible with the present invention.

Preferably, most of these central tubes are fixed on the top dome of the reactor, while they generally flow in a duct at the foot of the reactor intended to guide the relative shifts between the central tubes and reactors associated with thermal expansion phenomena.

Preferably, other central tubes are welded to the bottom dome of the reactor, the thermal expansion effects in this case being managed by installing a compensation tube bend, appropriately sized and positioned at the head of the central tubes.

The following description of a particular embodiment of the invention is given for a standard module comprising 4 hairpins, and for a 4-stage reactor configuration.

The central tube of a given module is connected to the hairpins of said module by means of communication allowing the introduction of the supply fluid inside each of the hairpins and the recovery of the partially vaporized fluid coming from these same hairpins.

In FIG. 8 a central tube has been shown schematically, extending over 2 consecutive stages designated N and N+1, each module comprising 4 hairpins designated E1, E2, E3 and E4 clockwise.

The central tube is generally divided into 2 independent circuits by means of either an internal stay or any other dividing device allowing at least two independent circuits to be created. For example, it may be a tube, coaxial to the central tube, situated inside said central tube and divided into two by a vertical partition. The annular part between the central tube and the inner tube itself being divided into two by two vertical partitions. Such a device also defines two independent circuits, a first circuit by the inner tube and a second circuit by the annular zone comprised between the internal tube and the central tube.

The invention is not limited by the means of division of the central tube into different sectors allowing the independent circuits to be defined.

The present invention is compatible with a number of independent circuits greater than 2, in As much as it is always possible to define an "alternating" schedule of supply for the hairpins, in the sense that will be given to this term in the remainder of the description.

Dividing the central tube into more than two independent circuits, for example 3 independent circuits, with a means of supply adapted to the hairpins forming a module, would remain fully within the scope of the invention, but for reasons of clarity, the following description is based on two independent circuits.

In the remainder of the text we shall describe the particular case of a means of division comprising an internal stay defining 4 equal sectors extending over the full height of the central tube and defining two independent circuits. Preferably, the number of independent circuits per central tube is thus two.

The internal stay thus divides the internal capacity of the central tube into 4 identical sectors paired along (L1)/(V1) for the first circuit and (L2)/(V2) for the second circuit. For the first circuit (L1)/(V1), the portion (L1) corresponds to the supply of liquid coolant, and the portion (V1) corresponds to the return of the partially vaporized coolant.

The portions (L1) and (V1) are not in communication at the central tube. The portion (L1) is a downpipe in the direction of the liquid coolant, and the portion (V1) an up-pipe in the direction of flow of the partially vaporized coolant.

In the same way, for the second circuit (L2)(V2), the portion (L2) corresponds to the supply of liquid coolant, and the portion (V2) corresponds to the return of the coolant, partially vaporized. In order to simplify, the first circuit will be called circuit L1, and the second circuit will be called L2.

The description will be better understood by following the diagram in FIG. 8.

According to this particular embodiment of the invention, the first circuit L1 supplies the two hairpins 1 and 3 situated at stage N, and the second circuit L2 supplies the 2 other hairpins of the same stage, i.e. the hairpins 2 and 4. At the following stage designated N+1, circuit L1 supplies the two hairpins 2 and 4, and the second circuit L2 supplies the two other hairpins 1 and 3.

It will thus be understood that this means of connection between the central tube and the hairpins of the module surrounding the central tube at the consecutive stages N and N+1 permits an alternation in the sense that, if the different hairpins of a vertical module group are considered, i.e. the different vertically aligned hairpins from one stage to the next, they are alternately supplied by circuit L1 and by circuit L2.

In the same way, for each module, one half of the hairpins is supplied by circuit L1, and the other half is supplied by circuit L2. In this example the choice has been made to supply two hairpins in diagonal from the same circuit, which corresponds to the preferred configuration.

However, supplying two adjacent hairpins, for example 1 and 2, via the circuit L1, the hairpins 3 and 4 thus being supplied via the circuit L2, would remain within the scope of the invention. At the following stage, the circuit L1 would supply hairpins 3 and 4, and circuit L2 would supply hairpins 1 and 2.

Generally, the central tube allows, via its 2 independent circuits, the supply of half a hairpin by its first, and another half a hairpin by its other circuit, the two half-hairpins being defined as desired.

Preferably, the "alternating" mode of supply allows an alternating supply to be carried out in the sense that the 2 hairpins supplied by the circuit L1 at a stage N will be supplied by the same circuit L1 at a stage N+2, and where the two other hairpins supplied by the circuit N2 at stage N will be supplied by the same circuit L2 at stage N+2.

The fact of having two independent circuits on each central tube also allows a circuit to be closed down when necessary, which has the effect of halting the circulation over half of the hairpins of a given stage and preserving the circulation over the other half of the hairpins.

The fact that this is carried out alternating from one stage to the next thus has the effect of maintaining a degree of homogeneity of the distribution of hairpins operating over the volume of the reactor as a whole.

Isolation of a circuit L1 or L2 can optionally be carried out from outside the reactor by operating the valves situated on each of these circuits. In the case of leakage from a hairpin, it is then possible to isolate the circuit L1 or L2 supplying this hairpin, while continuing normal operation of the unit. In circuits L1 and L2 a vacuum gauge device can be installed between each stage in order to provide an identical flow of coolant between each module.

In order to generalise the above description carried out in a particular case, we will use a two-character notation to identify each hairpin Eij of a particular module, the first character i designating the number of the hairpin forming part of a given module or position of the hairpin numbered 1,2,3,4 clockwise (as in FIG. 8), and the second character j designating the number of the stage in question, numbered 1,2,3,4 from bottom to top of the reactor (cf. FIG. 1).

In the case of the equivalence of the standard modules situated at a given stage, the two-character labelling is sufficient to designate any hairpin of the bundle. For example, hairpins E11, E21, E31, E41 designate the 4 hairpins situated on a given module of the first stage, starting with the hairpin situated in position 1, and continuing clockwise.

Hairpins E11, E12, E13, E14 designate the 4 hairpins in position 1, vertically aligned when passing stages 1, 2, 3 and 4 successively.

Thus on the basis of Table 1 a supply schedule is defined by allocating to each hairpin Eij its supply circuit L1 or L2. A hairpin supplied by the circuit L1 will generate an at least partially vaporized fluid which is recovered in circuit V1. To simplify, we start from circuit L1, but the full circuit comprises the supply circuit L1 and the recovery of the partially vaporized fluid by means of circuit V1. The same goes for L2 and V2.

Thus in Table 1, showing the supply according to a preferred embodiment of the invention, an alternation of supply circuits L1 and L2 can be observed, in the sense that two consecutive hairpins, whether clockwise within a given module or vertically from one stage to the other, are never supplied by the same circuit.

The expression "alternating supply" must thus be understood to have this precise meaning. The supply to the hairpins of the exchange bundle according to the invention is, in this preferred embodiment, alternated between two adjacent hairpins, either within a single module, or between two consecutive stages.

TABLE 1

| alternating supply | | | |
|---|---|---|---|
| E11 (L1) | E21 (L2) | E31 (L1) | E41 (L2) |
| E21 (L2) | E22 (L1) | E23 (L2) | E24 (L1) |
| E31 (L1) | E32 (L2) | E33 (L1) | E34 (L2) |
| E41 (L2) | E42 (L1) | E43 (L2) | E44 (L1) |

The vertically aligned arrangement of the modules is particularly beneficial when it is necessary to remove a hairpin from the reactor since, considering a hairpin situated at any stage of the reactor, it will be sufficient to remove the hairpin or hairpins situated vertically to the hairpin in question, without affecting the other hairpins of the bundle situated at the same level or at a lower level (removal from overhead) or higher level (removal at the bottom)

Moreover, if it is wished to stop the circulation of the fluid in a given module, it is possible to close one circuit L1 or L2 and to leave the other operating, which has the effect of keeping half the hairpins in each module operating and thus preserving a homogeneity of distribution of the operating hairpins.

An example of the various operations to be carried out for dismantling a hairpin situated at the lowest stage of the reactor (stage numbered 1) is described below.

A crane, winch or other item of lifting equipment is installed above the reactor.

The distance separating the lifting equipment from the head of the reactor is greater than the length of a hairpin. A manhole with an opening greater than the width of a hairpin is fitted in the dome at the top or the bottom of the reactor.

Thus for example, in the case of removal of a hairpin from the top of the reactor, a permanent beam is fitted on the top part of the reactor, the distance separating this beam from the head of the upper hairpin being greater than the length of a hairpin.

Temporary beams are installed in the reactor once the latter has been stopped, inertized and opened to the atmosphere, these beams forming a sort of grid covering the section of the reactor and cooperating with the permanent beam. Using this grid, temporary lifting equipment (hoist, winch type etc.) can be installed in the reactor and move in a horizontal plane above the modules.

In order to dismantle a defective hairpin situated at the bottom of the reactor, for example the hairpin E11, it is advisable to first dismantle the hairpins situated above the latter, i.e. E14, then E13 and E12. To this end the person skilled in the art will attach the hairpin E14 to the lifting means situated inside, using slings, for example.

In a second step, the welds attaching the hairpin E14 to the central tube are cut. The welds of the lower and upper support elements are also cut. The hairpin E14 is removed from its original module by means of the lifting equipment inside the reactor. Once removed from the exchanger unit, the winch and the hairpin are moved over the grid formed by the temporary beams in order to position the hairpin under the upper manhole of the reactor. In this position the hairpin E14 can be removed from the reactor by means of the external lifting system. The hairpin E13 can be taken out of the reactor using the same procedure. The hairpin E12 can be taken out of the reactor using the same procedure. As the access to the hairpin E11 has been freed, it is then possible to take out the hairpin E11 using the same procedure as for hairpins E14, E13 and E12.

If necessary, the process can then be reversed in order where appropriate to replace the original defective hairpin E11 with a new hairpin, and in particular in order to reposition the hairpins E12 to E14 before the reactor is re-started.

Thus the invention also relates to a method of removing a hairpin E11 from a reactor for Fischer-Tropsch synthesis comprising a exchange bundle according to the present description, comprising the following steps:

a) The hairpin E14, situated vertically to the hairpin E11 in stage 4 is attached by a lifting means situated inside the reactor, using slings.

b) The welds connecting the hairpin E14 to the central tube of the corresponding module are cut, the welds of the upper and lower support elements flanking the hairpin E14 are also cut.

c) The hairpin E14 is removed from its original module by means of a lifting device inside the reactor and said hairpin is moved over the grid formed by the temporary beams in order to position it under the upper manhole of the reactor.

d) The hairpin E14 is removed from this position out of the reactor using an external lifting system.

e) The hairpin E13 is removed from the reactor in the same way as in steps a) to c).

f) The hairpin E12 is removed from the reactor in the same way as in steps a) to c).

g) The hairpin E11 is removed from the reactor in the same way as in steps 1 to 3.

EXAMPLE ACCORDING TO THE INVENTION

The example below relates to an industrial-scale reactor for Fischer-Tropsch synthesis, operating with a feed of 430,000 $Nm^3$/hour and needing to remove 242 MW/h (megawatts per hour).

A module has 4 hairpins, each hairpin comprising a vertical conduit describing 24 vertical outward and return legs, each outward and return leg being separated by a U-shaped portion of the duct. Each outward (or return) leg is 6.9 metres long.

Each vertical conduit comprises a tube of 52.5 mm internal diameter and 3.9 mm thick (1 mm=$10^{-3}$ m).

There are therefore 24 outward and return legs (or passes) per hairpin.

The total mass of a module is 7.2 metres in height and 1.4 metres in width.

The central tube of a module has an outside diameter of 324 mm. There are 24 identical modules per stage, and 4 stages distributed regularly over the height of the reactor with a space of 1.2 metres between stages.

To these 24 standard modules are added 8 non-standard modules each comprising 3 hairpins, and situated on the wall of the reactor in order to best occupy the corresponding space.

There are 32 hairpins adjoining the wall of the reactor of which 8 form part of non-standard modules, the other 24 belonging to standard modules. The total flow-rate of cooling water in the tubes is of 3000 to 4000 tonne/hour. The supply schedule for the hairpins is an alternating plan according to Table 1 of the detailed description.

This configuration of the exchanger allows the heat given off to be removed and the exothermicity of the reaction thus controlled.

The invention claimed is:

1. Heat exchange bundle contained in the inside of a reactor for Fischer-Tropsch synthesis comprising a casing and fitted with means of introducing reaction fluids, means of introducing a coolant and means of evacuating said partially vaporized coolant, said bundle comprising at least two stages of identical modules, each module comprising sets of identical hairpins configured as pipes arranged in series and connected to one another by U-bends, the hairpins being distributed around the central tube common to the module in question and the modules being vertically aligned with the module in question at the different stages of the bundle, in which said central tube has separations permitting at the same time supply of coolant to the hairpins of the module and the recovery of the coolant from the hairpins when the coolant is partially vaporized from the same hairpins due to heat from reaction of the reagents.

2. Heat exchange bundle according to claim 1 in which the supply of the hairpins of said bundle is alternated between two adjacent hairpins, either inside the same module or between two consecutive stages.

3. Heat exchange bundle according to claim 1 in which the exchange surface per unit of volume of reaction medium is comprised between 4 and 30 $m^2/m^3$.

4. Heat exchange bundle according to claim 1 in which the number of hairpins per module is equal to 2, 4, 6 or 8.

5. Heat exchange bundle according to claim 1 in which the number of stages is comprised between 2 and 6.

6. Heat exchange bundle according to claim 1 in which the number of hairpins per module is equal to 4.

7. Heat exchange bundle according to claim 1 in which the number of modules per stage is comprised between 5 and 80.

8. Heat exchange bundle according to claim 1 in which the central tube is divided by an internal stay defining 4 equal vertical sectors, allowing two independent circuits to be defined for coolant supply and recovery of coolant, partially vaporized.

9. Heat exchange bundle according to claim 1 in which the hairpins of each module comprise a number of vertical paths, or passes, between 10 and 50.

10. Heat exchange bundle according to claim 1 in which each central tube of a module comprises primary leaves welded along the external wall of said central tube and extending along the whole of said wall, in order to increase inertia.

11. Heat exchange bundle according to claim 10 in which each central tube is fitted, in addition to the primary leaves, with secondary leaves welded to the primary leaves, so as to make a T-shape in combination with the latter.

12. Method for removal of a hairpin (E11) from an exchange bundle according to claim 1, comprising the following steps:

a) the hairpin (E14), situated vertically to the hairpin (E11) at stage 4 is attached by a lifting means situated inside the reactor, using slings;

b) the welds connecting the hairpin (E14) to the central tube of the corresponding module are cut, the welds of the upper and lower support elements flanking the hairpin (E14) are also cut;

c) the hairpin (E14) is removed from its original module by means of a lifting device inside the reactor and said hairpin is moved over the grid formed by the temporary beams in order to position it under the upper manhole of the reactor;

d) the hairpin (E14) is removed from this position out of the reactor using an external lifting system;

e) the hairpin (E13) is removed from the reactor in the same way as in steps a) to c);

f) the hairpin (E12) is removed from the reactor in the same way as in steps a) to c); and g) The hairpin (E11) is removed from the reactor in the same way as in steps a) to c).

13. Heat exchange bundle according to claim 1 in which the exchange surface per unit volume of reaction medium is between 4 and 20 $m^2/m/^3$.

14. Heat exchange bundle according to claim 1 in which the exchange surface per unit volume of reaction medium is between 4 and 15 $m^2/m^3$.

* * * * *

UNITED STATES PATENT AND TRADEMARK OFFICE

CERTIFICATE OF CORRECTION

PATENT NO. : 7,776,287 B2
APPLICATION NO. : 11/785911
DATED : August 17, 2010
INVENTOR(S) : Francois Hugues It is certified that error appears in the above-identified patent and that said Letters Patent is hereby corrected as shown below:

Column 10, line 9 reads: "comprised between 4 and 30 $m^2/m^3$."

Should read: -- between 4 and 30 $m^2/m^3$. --

Column 10, line 17 reads: "number of modules per stage is comprised between 5 and 80."

Should read: -- number of modules per stage is between 5 and 80. --

Signed and Sealed this

Second Day of November, 2010

David J. Kappos
*Director of the United States Patent and Trademark Office*